United States Patent
Kim et al.

(10) Patent No.: US 8,698,991 B2
(45) Date of Patent: Apr. 15, 2014

(54) LIQUID CRYSTAL DISPLAY AND METHOD FOR MANUFACTURING THE SAME

(71) Applicant: Samsung Display Co., Ltd., Gyeonggi-Do (KR)

(72) Inventors: Su-Jeong Kim, Seoul (KR); Seung-Beom Park, Seoul (KR); Jae-Jin Lyu, Yongin-si (KR); Keun-Chan Oh, Cheonan-si (KR); Yoon-Sung Um, Yongin-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 13/733,568

(22) Filed: Jan. 3, 2013

(65) Prior Publication Data
US 2013/0120682 A1    May 16, 2013

Related U.S. Application Data

(62) Division of application No. 12/839,601, filed on Jul. 20, 2010, now Pat. No. 8,368,862.

(30) Foreign Application Priority Data

Dec. 2, 2009  (KR) .................. 10-2009-0118557

(51) Int. Cl.
G02F 1/1343  (2006.01)

(52) U.S. Cl.
USPC .......................................................... 349/144

(58) Field of Classification Search
USPC .......................................................... 349/144
See application file for complete search history.

(56) References Cited

U.S. PATENT DOCUMENTS

| 6,577,374 | B1 | 6/2003 | Nakata et al. |
| 6,917,393 | B2 | 7/2005 | Sakamoto et al. |
| 2009/0303422 | A1 | 12/2009 | Kim et al. |
| 2009/0316102 | A1 | 12/2009 | Cho et al. |
| 2010/0157186 | A1 | 6/2010 | Kim et al. |
| 2010/0157232 | A1 | 6/2010 | Kim et al. |

*Primary Examiner* — Timothy L Rude
(74) *Attorney, Agent, or Firm* — Cantor Colburn LLP

(57) ABSTRACT

A method for manufacturing a liquid crystal display ("LCD") includes; disposing a gate line including a gate electrode on a substrate, disposing a gate insulating layer on the gate line, disposing a data layer including a data line, source electrode and a drain electrode facing the source electrode on the gate insulating layer, disposing a color filter on the gate insulating layer, disposing an overcoat layer on the color filter, disposing a planarization layer on a portion of the overcoat layer corresponding to the gate line, the data line and the drain electrode, and disposing a pixel electrode in contacted with the overcoat layer in a region corresponding to the color filter.

10 Claims, 11 Drawing Sheets

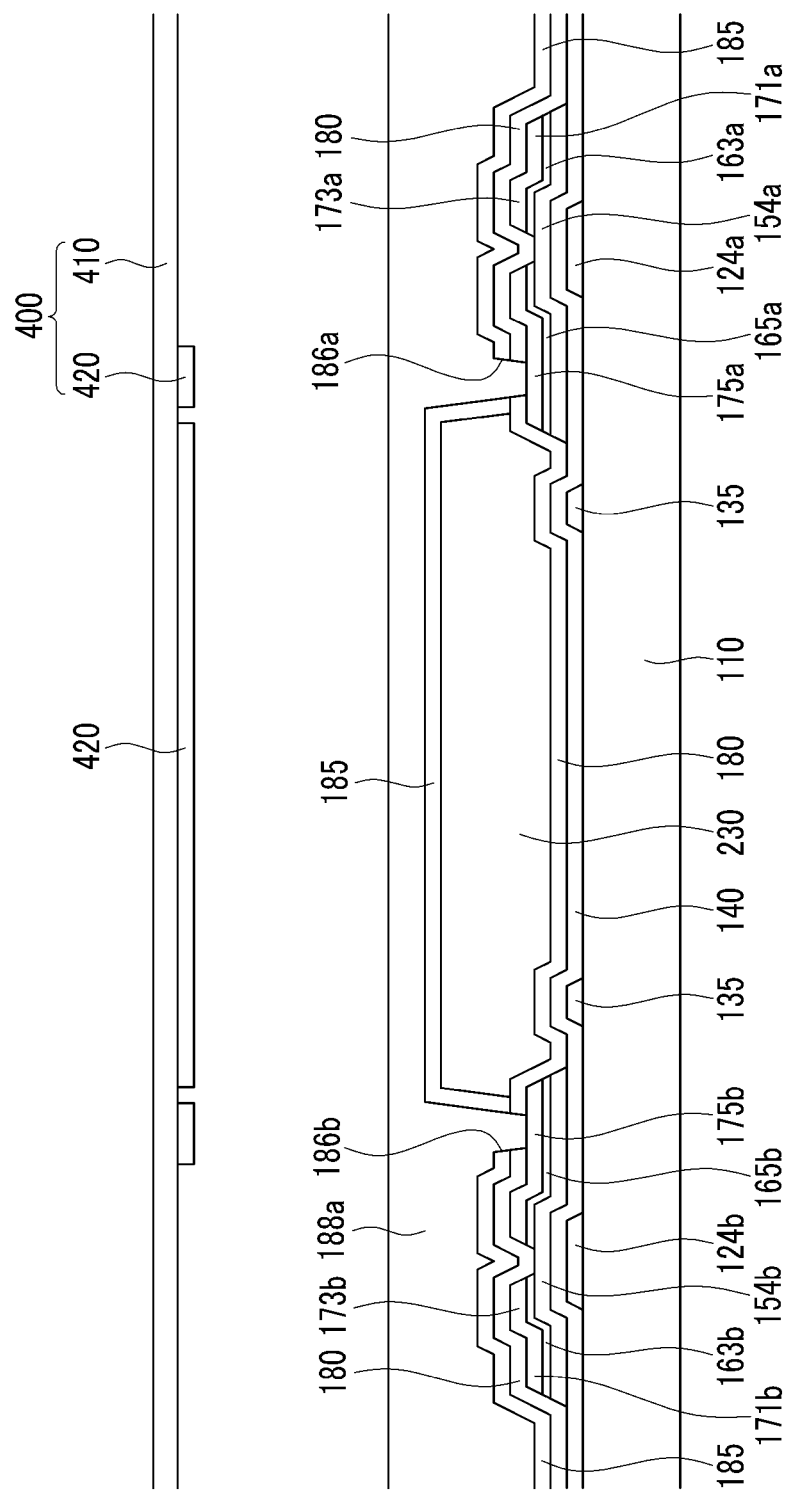

LIQUID CRYSTAL DISPLAY AND METHOD FOR MANUFACTURING THE SAME

CROSS REFERENCE TO RELATED APPLICATIONS

This application is a divisional of U.S. patent application Ser. No. 12/839,601, filed on Jul. 20, 2010, which claims priority to Korean Patent Application No. 10-2009-0118557, filed on Dec. 2, 2009, and all the benefits accruing therefrom under 35 U.S.C. §119, the content of which in its entirety is herein incorporated by reference.

BACKGROUND OF THE INVENTION (a) Field of the Invention

The present invention relates to a liquid crystal display ("LCD").

(b) Description of the Related Art

Liquid crystal displays ("LCDs") are now widely used as one of most popular flat panel displays. A typical LCD has two opposing display panels on which electric field-generating electrodes are formed, and a liquid crystal layer interposed between the panels. In the typical LCD, voltages are applied to the field-generating electrodes to align liquid crystal molecules of the liquid crystal layer in order to control the amount of light-transmittance therethrough, thereby performing an image display function.

Among the typical types of LCDs, a vertical alignment ("VA") mode LCD, which arranges major axes of liquid crystal molecules to be substantially perpendicular to the display panel in a state in which an electric field is not applied, has been developed.

In a VA mode LCD, a desirable wide viewing angle characteristic can be realized by forming cutouts, such as minute slits, in the field-generating electrodes and/or protrusions on the field-generating electrodes. Since the cutouts and protrusions can determine the tilt directions of the LC molecules, the tilt directions can be distributed in various directions using the cutouts and protrusions such that the reference viewing angle of the resulting display is widened.

A structure in which field-generating electrodes are respectively formed on two display panels is generally used. Such a structure typically includes a plurality of pixel electrodes and thin film transistors arranged in a matrix format on one display panel, and color filters of red, green, and blue and one common electrode which covers the entire surface of the other display panel are formed on the other display panel. However, in such an arrangement it is difficult to align the pixel electrodes and the color filters to each other, thereby increasing the probability of generating an alignment error. To solve this problem, a color filter on array ("CoA") structure in which the pixel electrode and the color filter are formed on the same display panel has been developed.

In the CoA structure, to maximize the aperture ratio a structure reducing the size of a contact hole using an organic layer is proposed, and the organic layer is used as a planarization layer such that the size of the contact hole is largely reduced thereby increasing the aperture ratio, however, the increase effect of the transmittance is slight due to the absorption ratio of the organic layer compared with the increased aperture ratio.

BRIEF SUMMARY OF THE INVENTION

The present invention maximizes the transmittance of a liquid crystal display ("LCD") by removing an organic layer within the pixel area thereof.

An exemplary embodiment of a method for manufacturing an LCD according to the present invention includes; disposing a gate line including a gate electrode on a substrate, disposing a gate insulating layer on the gate line, disposing a data line and a drain electrode on the gate insulating layer, wherein the data line includes a source electrode facing the drain electrode, disposing a color filter on the gate insulating layer, disposing an overcoat layer on the color filter, disposing a planarization layer on a portion of the overcoat layer corresponding to the gate line, the data line and the drain electrode and disposing a pixel electrode in contact with the overcoat layer in a region corresponding to the color filter.

In one exemplary embodiment, the disposing of the planarization layer may include; coating an organic layer on the overcoat layer, patterning the organic layer and the overcoat layer using a half-tone mask to form a contact hole which exposes the drain electrode, and to reduce a thickness of the organic layer in a region corresponding to the color filter and ashing the patterned organic layer.

In one exemplary embodiment, the thickness of the patterned organic layer disposed in the region corresponding to the color filter may be in a range of about 0.1 um to about 0.7 um.

In one exemplary embodiment, the ashing may be executed in the range of about 2 seconds to about 30 seconds.

In one exemplary embodiment, the forming of the planarization layer may include; patterning the overcoat layer through a photolithography to form a contact hole which exposes the drain electrode, coating an organic layer on the overcoat layer, and removing a portion of the organic layer corresponding to the color filter and a portion of the organic layer corresponding to where the contact hole is formed.

In one exemplary embodiment, the method may further include disposing a passivation layer between the data layer and the color filter.

In one exemplary embodiment, the method may further include disposing a light blocking member on the planarization layer.

In one exemplary embodiment, the method may further include disposing a spacer on the planarization layer after disposing the light blocking member on the planarization layer.

In one exemplary embodiment, the method may further include simultaneously disposing a light blocking member and a spacer on the planarization layer.

An exemplary embodiment of an LCD according to the present invention includes; a substrate, a gate line including a gate electrode disposed on the substrate, a gate insulating layer disposed on the gate line, a data layer including a data line, a source electrode and a drain electrode facing the source electrode on the gate insulating layer, a passivation layer disposed on the gate insulating layer and the data layer, a color filter disposed on the passivation layer in a pixel area, an overcoat layer disposed on the passivation layer and the color filter, a planarization layer disposed on a portion of the overcoat layer corresponding to the gate line and the data layer, and a pixel electrode disposed on the overcoat layer and in contact with the overcoat layer.

In one exemplary embodiment, the pixel electrode may be disposed on at least a portion of the color filter.

In one exemplary embodiment, the planarization layer may be made of an organic material.

In one exemplary embodiment, the passivation layer, the overcoat layer, and the planarization layer may have a contact hole which connects the pixel electrode and the drain electrode.

In one exemplary embodiment, the pixel electrode may include a first sub-pixel electrode and a second sub-pixel electrode which are separated from each other.

In one exemplary embodiment, the first sub-pixel electrode and the second sub-pixel electrode may respectively include a plurality of branches.

In one exemplary embodiment, the second sub-pixel electrode may include a connection enclosing the branches of the first sub-pixel electrode.

In one exemplary embodiment, a light blocking member disposed on the planarization layer may be further included.

In one exemplary embodiment, a spacer disposed on the planarization layer may be further included.

Another exemplary embodiment of an LCD according to the present invention includes; a substrate, a gate line including a gate electrode disposed on the substrate, a gate insulating layer disposed on the gate line, a data layer including a data line, a source electrode and a drain electrode facing the source electrode, wherein the data layer is disposed on the gate insulating layer, a color filter disposed on the gate insulating layer and the data layer, a planarization layer disposed on a portion of gate line, the data line and the drain electrode, and a pixel electrode disposed on the color filter, wherein the planarization layer is omitted between the color filter and the pixel electrode.

According to an exemplary embodiment of the present invention, the organic layer of the light transmittance region in the liquid crystal display is removed such that the transmittance may be maximized.

BRIEF DESCRIPTION OF THE DRAWINGS

The above and other aspects, advantages and features of this disclosure will become more apparent by describing in further detail exemplary embodiments thereof with reference to the accompanying drawings, in which:

FIG. 10 and FIG. 11 are cross-sectional views showing another exemplary embodiment of a manufacturing method of an LCD according to the present invention.

DETAILED DESCRIPTION OF THE INVENTION

Figure 1:
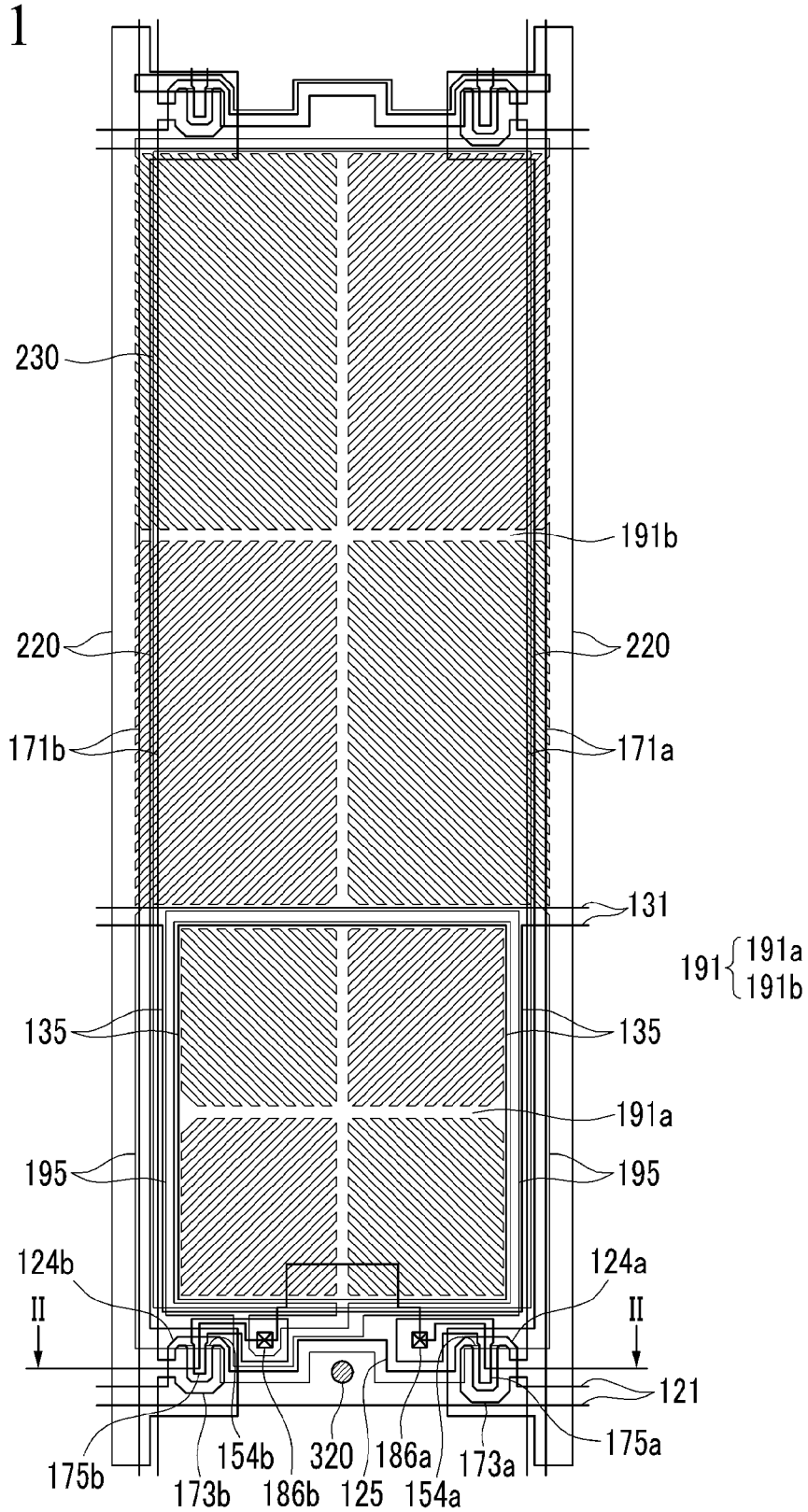
FIG. 1 is a top plan view of an exemplary embodiment of a liquid crystal display ("LCD") according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

Figure 2:
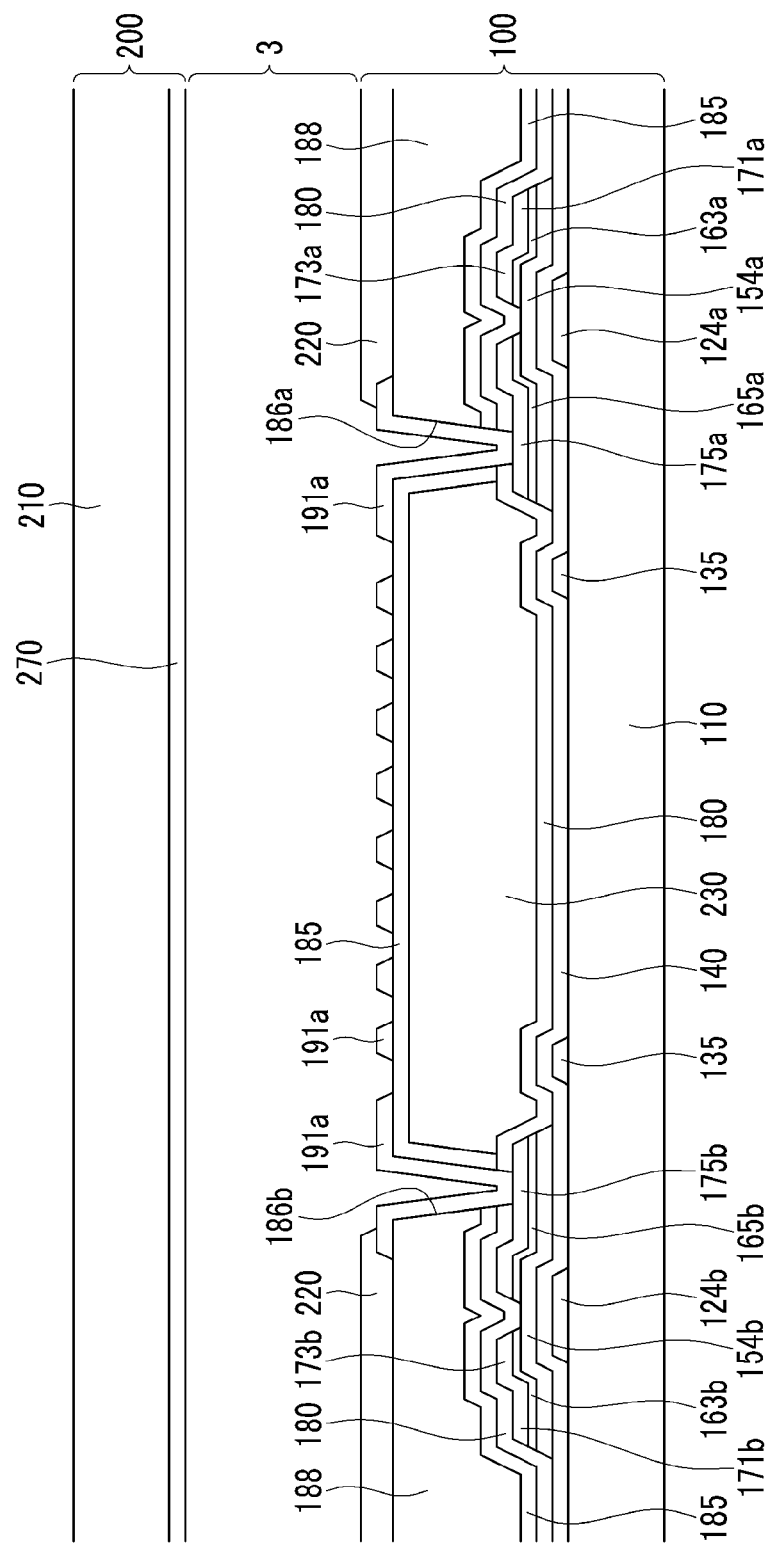
FIG. 2 is a cross-sectional view taken along line II-II of FIG. 1.

FIG. 1 is a top plan view of an exemplary embodiment of a liquid crystal display ("LCD") according to the present invention, and FIG. 2 is a cross-sectional view taken along line II-II of FIG. 1.

As shown in FIGS. 1 and 2, an exemplary embodiment of an LCD according to the present invention includes a lower panel 100 and an upper panel 200 facing each other, and a liquid crystal layer 3 interposed between two display panels 100 and 200.

First, the lower panel 100 will be described.

A plurality of gate lines 121 and a plurality of storage electrode lines 131 are formed on an insulating substrate 110. The gate lines 121 extend substantially in a transverse direction and may transmit gate signals therealong. Each gate line 121 includes a plurality of first and second gate electrodes 124a and 124b protruding upward therefrom. Also, each gate line 121 includes a protrusion 125 protruding upward between the gate electrodes 124a and 124b within each pixel. In the present embodiment the storage electrode lines 131 extend substantially parallel to the gate lines 121, and include a plurality of storage electrodes 135 extending therefrom. However, alternative exemplary embodiments include configurations wherein the shape and disposition of the storage electrode lines 131 may be variously changed. Additional alternative exemplary embodiments include configurations wherein the storage electrode lines 131 and the storage electrodes 135 may be omitted.

A gate insulating layer 140 is formed on the gate line 121 and the storage electrode line 131, and a plurality of semiconductors 154a and 154b, exemplary embodiments of which may be made of amorphous or crystallized silicon, or other materials with similar characteristics are formed on the gate insulating layer 140.

A plurality of pairs of ohmic contacts 163a, 163b, 165a, and 165b are formed on the semiconductor 154a and 154b, and exemplary embodiments of the ohmic contacts 163a, 163b, 165a and 165b may be made of a material such as n+ hydrogenated amorphous silicon in which an n-type impurity such as phosphorus is doped at a high concentration, or alternatively the ohmic contacts 163a, 163b, 165a and 165b may be made of silicide or another material with similar characteristics.

Portions of the plurality of pairs of data lines 171a and 171b are referred to as source electrodes 173a and 173b, respectively. The source electrodes 173a and 173b and a plurality of pairs of first and second drain electrodes 175a and 175b are formed on the ohmic contacts 163a, 163b, 165a and 165b and the gate insulating layer 140. In one exemplary embodiment, the data lines 171a and 171b, the source electrodes 173a and 173b and the drain electrodes 175a and 175b may all be formed from a single data layer, e.g., via etching, photo-processing, etc.

The data lines 171a and 171b transfer a data signal and are mainly extended in a longitudinal direction, thereby being disposed substantially perpendicular to the gate lines 121. The first and second source electrodes 173a and 173b may be curved to have a "U" shape and extend toward the first and second gate electrodes 124a and 124b, and the first and second source electrodes 173a and 173b respectively face the first and second drain electrodes 175a and 175b with respect to the first and second gate electrodes 124a and 124b.

Exemplary embodiments of the first and second drain electrodes 175a and 175b extend starting from one end thereof which is enclosed by the first and second source electrodes 173a and 173b and extended upward therefrom, and the other end thereof may have a wide area which facilitates connection to another layer. However, alternative exemplary embodiments include configurations wherein the shapes and arrangements of the first and second drain electrodes 175a and 175b and the data lines 171a and 171b may be modified in various forms.

The first and the second gate electrodes 124a and 124b, the first and the second source electrodes 173a and 173b, and the first and the second drain electrodes 175a and 175b along with the first and second semiconductors 154a and 154b respectively form first and second thin film transistors ("TFTs"), and the channels of the first and second TFTs are respectively formed in the first and second semiconductors 154a and 154b between the first and second source electrodes 173a and 173b and the first and second drain electrodes 175a and 175b.

The semiconductors 154a and 154b have exposed portions not covered by the data lines 171a and 171b and the drain electrodes 175a and 175b. The exposed portions include a portion disposed between the source electrodes 173a and 173b and the drain electrodes 175a and 175b, respectively.

A passivation layer 180, exemplary embodiments of which may be made of silicon nitride, silicon oxide or other materials with similar characteristics, is formed on the data lines 171a and 171b, the drain electrodes 175a and 175b and the exposed portions of the semiconductors 154a and 154b.

A color filter 230 is formed in the pixel area on the passivation layer 180. The color filter 230 is omitted in portions corresponding to the first and second thin film transistors and the gate line 121, and is only disposed in the pixel area where the light is transmitted.

An overcoat 185 is formed on the passivation layer 180 and the color filter 230. The overcoat 185 protects the color filter 230, e.g., from abrasion or from damage during subsequent processing steps, and the passivation layer 180 may prevent the pigment of the color filter 230 from flowing into the semiconductors 154a and 154b.

A planarization layer 188 flattening the lower panel 100 is formed on the overcoat 185. In the present exemplary embodiment, the planarization layer 188 is formed of an organic material, and is positioned throughout the lower panel excluding the portion of the lower panel corresponding to the color filter 230.

The planarization layer 188, the overcoat 185 and the passivation layer 180 have a plurality of contact holes 186a and 186b exposing the first and second drain electrodes 175a and 175b.

A plurality of pixel electrodes 191 are formed on the planarization layer 188 and the overcoat 185, and each pixel electrode 191 includes first and second sub-pixel electrodes 191a and 191b that are separated from each other.

In one exemplary embodiment, the area occupied by the second sub-pixel electrode 191b may be larger than the area occupied by the first sub-pixel electrode 191a in an individual pixel electrode 191, and in one such exemplary embodiment the area of the second sub-pixel electrode 191b may be about 1.0 to about 2.2 times the area of the first sub-pixel electrode 191a. However, alternative exemplary embodiments include configurations wherein the shape and the area ratio of the first and second subpixel electrodes 191a and 191b may be variously changed.

In the present exemplary embodiment, the overall shape of the combined first and second subpixel electrodes 191a and 191b is a quadrangle, and each includes an intersecting stem having a transverse stem and a longitudinal stem that are substantially perpendicular to one another. Also in the present exemplary embodiment, each pixel electrode is divided into four sub-regions by the transverse stem and the longitudinal stem, and each of the sub-regions includes a plurality of minute branches.

The second sub-pixel electrode 191b includes a pair of branches 195 extending substantially parallel to and partially overlapping the data lines 171a and 171b. The pair of branches 195 are disposed between the first sub-pixel electrode 191a and the data lines 171a and 171b, are connected to each other at the lower portion of the first sub-pixel electrode 191a, and overlap the gate line 121. At least one branch of the two branches 195 is extended and is physically and electrically connected to the second drain electrode 175b through the contact hole 186b. Also, the first sub-pixel electrode 191a is connected to the first drain electrode 175a through the contact hole 186a.

The first and second sub-pixel electrodes 191a and 191b receive the data voltage from the first and second drain electrodes 175a and 175b.

A light blocking member 220 is formed on a portion corresponding to the gate line 121, the data lines 171a and 171b, and the first and second TFTs on the planarization layer 188, and a spacer 320 for maintaining an interval between the lower panel 100 and the upper panel 200 is formed on a portion corresponding the protrusion 125 of the gate line 121.

Next, the upper panel 200 will be described.

Referring to the upper panel 200, in the present exemplary embodiment a common electrode 270 is formed on substantially the whole surface of a transparent insulation substrate 210. However, alternative exemplary embodiments include configurations wherein the common electrode 270 may not be formed on the entire surface of the transparent insulation substrate 210 or wherein the common electrode 270 may be formed in the lower panel 100.

The liquid crystal layer 3 is positioned between the upper panel 200 and the lower panel 100.

As described above, the planarization layer 188 is omitted under the pixel electrode 191 such that the planarization layer 188 may function as a light-absorbing layer, thereby preventing the deterioration of light transmittance through the LCD.

Next, an exemplary embodiment of a manufacturing method of the exemplary embodiment of an LCD shown in FIG. 1 and FIG. 2 will be described with reference to FIG. 3 to FIG. 9. FIG. 3 to FIG. 9 are cross-sectional views sequentially showing an exemplary embodiment of a method for manufacturing the exemplary embodiment of an LCD of FIG. 1.

Figure 3:
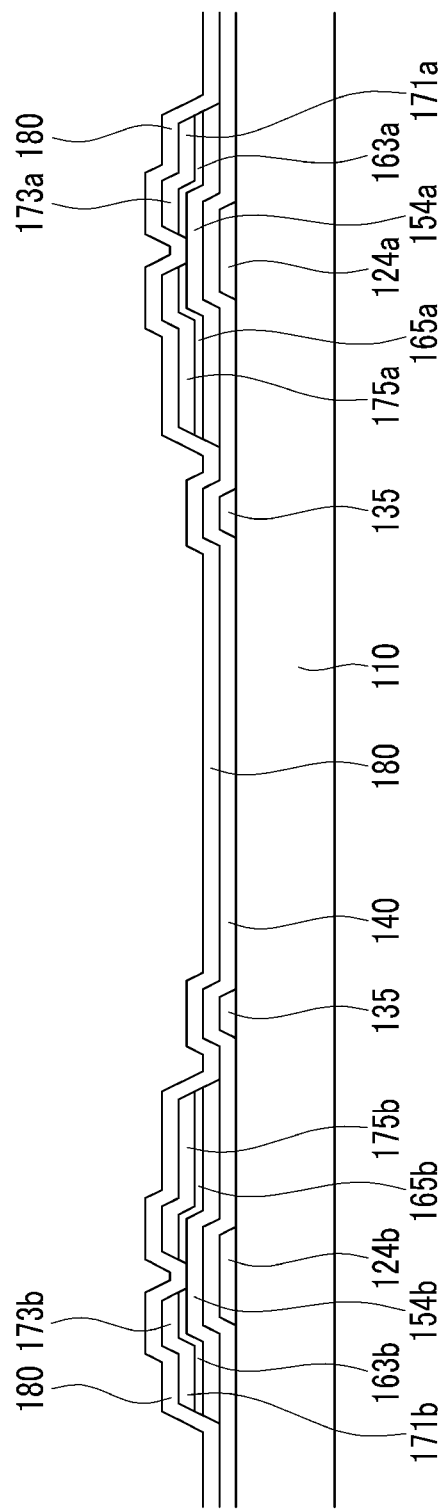
FIG. 3 to FIG. 9 are cross-sectional views sequentially showing an exemplary embodiment of a method for manufacturing the LCD of FIG. 1.

First, as shown in FIG. 3, a gate line 121 including gate electrodes 124a and 124b, a storage electrode line 131 including a storage electrode 135, a gate insulating layer 140, data lines 171a and 171b including source electrodes 173a and 173b, and drain electrodes 175a and 175b are sequentially formed on an insulation substrate 110, and a passivation layer 180 is formed on the whole surface thereof.

Figure 4:
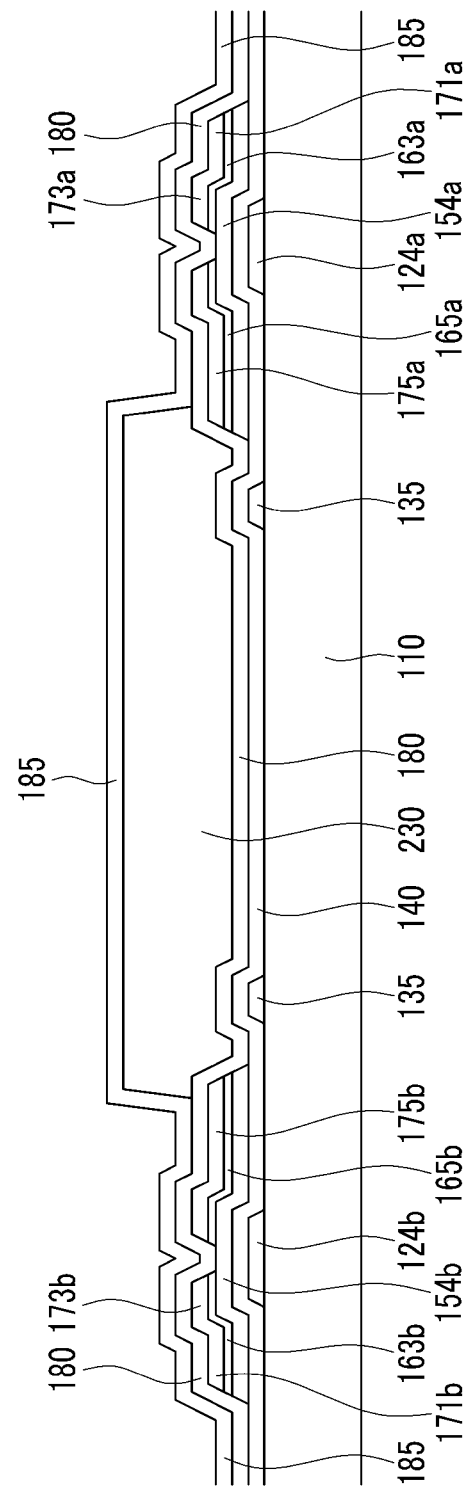

Next, as shown in FIG. 4, a color filter 230 is formed on the passivation layer 180. The color filter 230 is not formed in portions corresponding to the first and second TFTs and the gate line 121, and is only formed in the pixel area where the light is transmitted therethrough. Next, an overcoat 185 is formed on the passivation layer 180 and the color filter 230. Exemplary embodiments of the overcoat 185 may be formed of an inorganic layer such as silicon oxide, silicon nitride or other similar materials to protect the color filter 230.

Figure 5:
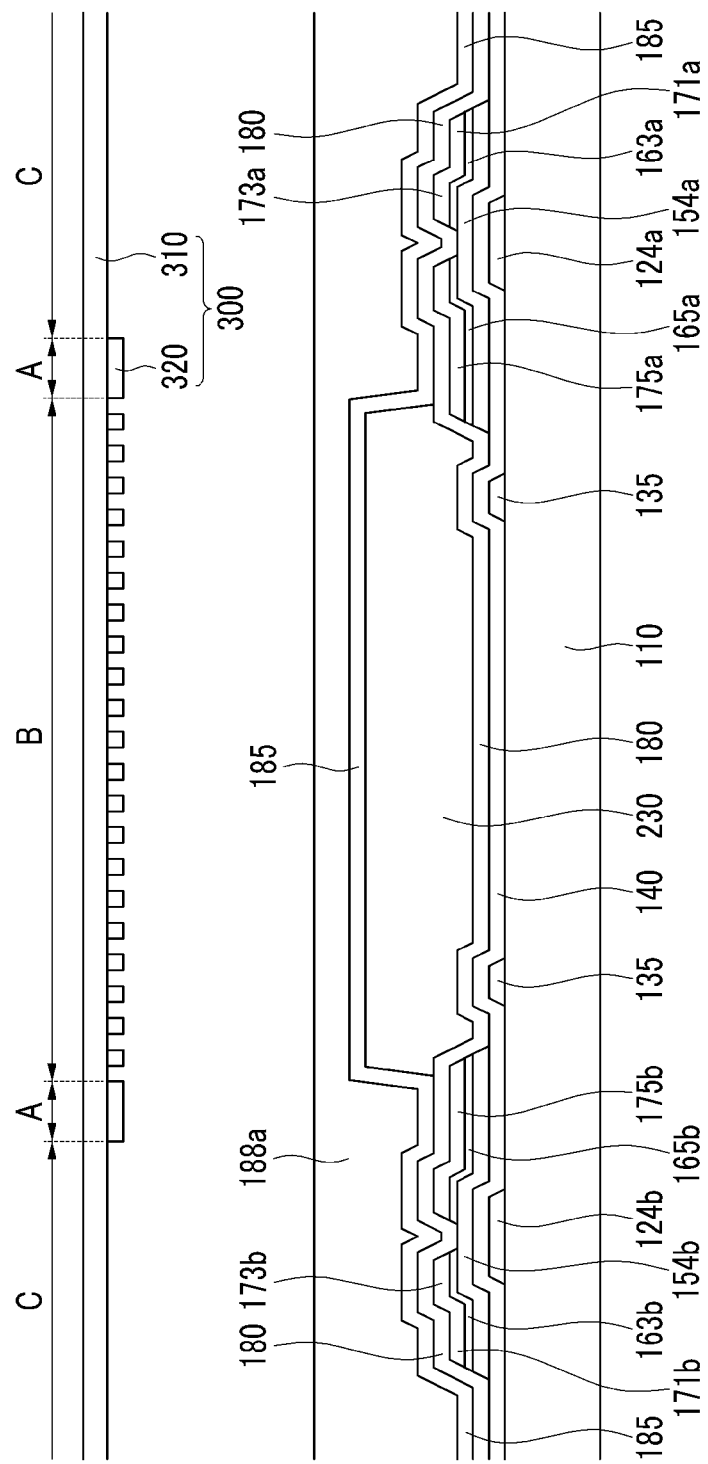

Next, as shown in FIG. 5, a planarization organic layer 188a made of the organic material described above is coated on the overcoat 185, and is exposed using a half-tone mask 300. In the present exemplary embodiment, the half-tone mask 300 includes a transparent substrate 310 and a light blocking layer 311. In the present exemplary embodiment, the light blocking layer 311 completely blocks the light at the region A corresponding to the contact holes 185a and 185b. Also in the present exemplary embodiment, the half-tone mask 300 is formed with a form of a slit or a semi-transparent layer at the region B corresponding to the color filter 230 for the light to be partially transmitted therethrough. Also in the present exemplary embodiment, the half-tone mask 300 has a configuration wherein the light blocking layer 311 is removed at the remaining portion C. The present exemplary embodiment exemplarily shows the embodiment that the planarization organic layer 188a is made of a material having negative photosensitivity. However, in an alternative exemplary embodiment wherein the planarization organic layer 188a is formed of a material having positive photosensitivity, the light blocking layer 311 is removed at the portion A corresponding to the contact holes 185a and 185b for the light to be transmitted, the region B corresponding to the color filter 230 is formed with a form of the slit or the semi-transparent layer for the light to be partially transmitted, and the light blocking layer 311 is formed at the remaining region C to completely block the light.

Figure 6:
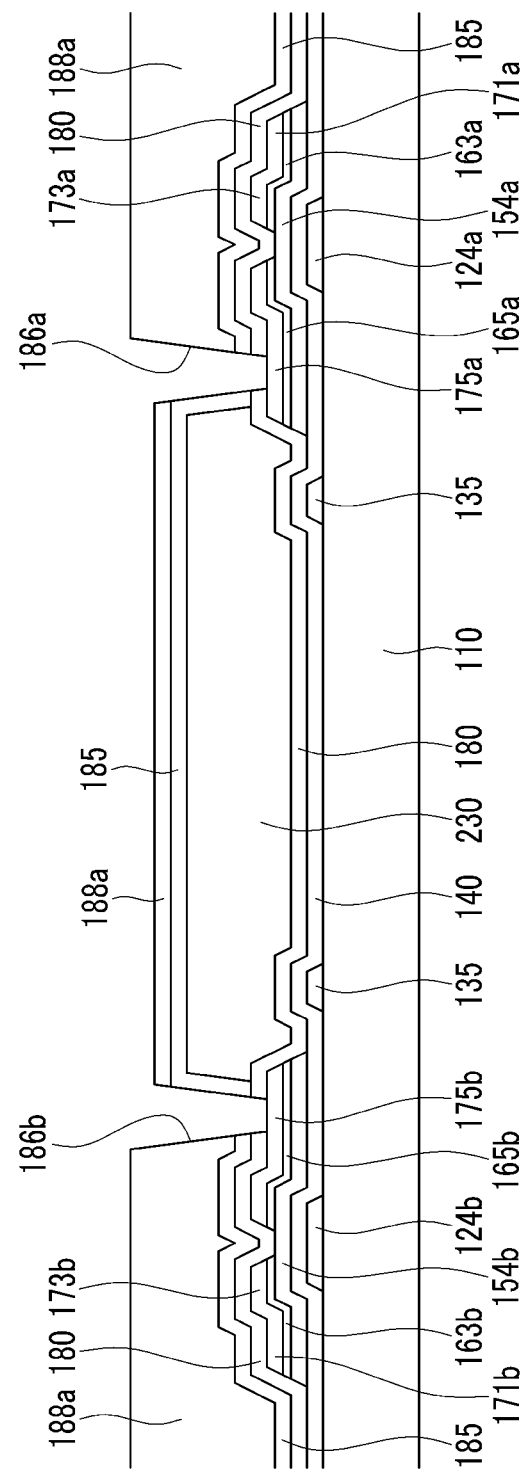

Next, as shown in FIG. 6, the exposed planarization organic layer 188a is developed to form the planarization organic layer 188a having different thicknesses depending on positions thereof. That is, the thickness of the planarization organic layer 188a on a portion of the lower panel 100 corresponding to the color filter 230 is less than the thickness of the planarization organic layer 188a on a remaining portion of the lower panel 100. In one exemplary embodiment, the thickness of the planarization organic layer 188a corresponding to the color filter 230 is in the range of about 0.1 um to about 0.7 um to stably execute an ashing process for removing the planarization organic layer 188a corresponding to the color filter 230 and leaving the planarization organic layer 188a corresponding to the remaining portion after the ashing process. Here, the contact holes 185a and 185b exposing the drain electrodes 175a and 175b are formed.

Figure 7:
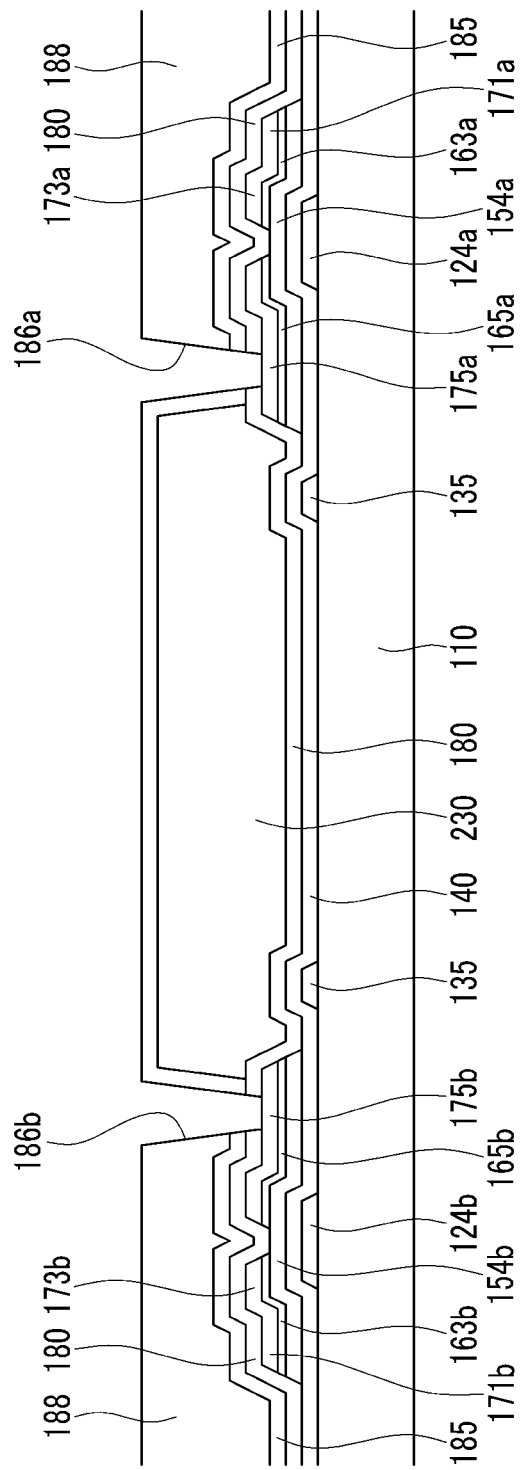

Next, as shown in FIG. 7, the planarization organic layer 188a is ashed, e.g., undergoes an ashing process, such that the planarization organic layer 188a corresponding to the color filter 230 is removed, and simultaneously the portion of the planarization organic layer 188a corresponding to the remaining portion is only partially removed thereby forming a planarization layer 188. Exemplary embodiments include configurations wherein the ashing may be executed for about 2-30 seconds.

Figure 8:
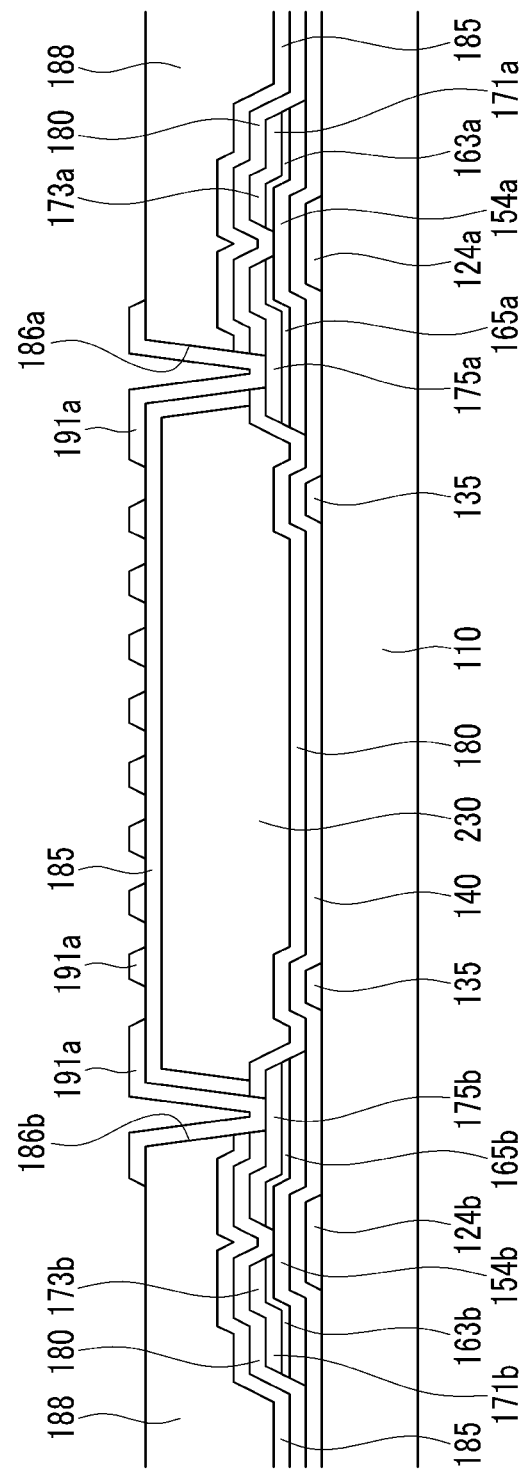

Next, as shown in FIG. 8, a pixel electrode 191 connected to the drain electrodes 175a and 175b through the contact holes 185a and 185b, respectively, is formed on the overcoat 185, over the planarization layer 188 and over the color filter 230.

Figure 9:
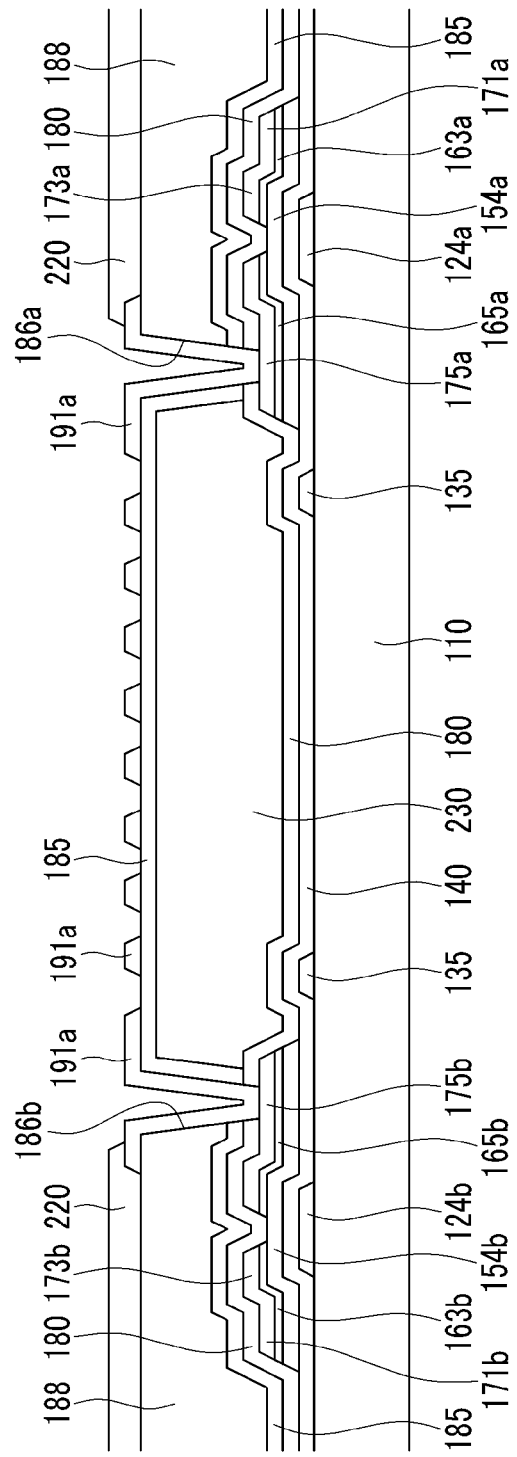

Next, as shown in FIG. 9, a light blocking member 220 is formed on the first and second TFTs and the data lines 171a and 171b. In one exemplary embodiment, a light blocking layer is formed on the first and second TFTs, the data lines 171a and 171b, and the gate lines 121, and is exposed and developed using a slit mask to form the light blocking member 220 and a spacer 320 together.

Next, as shown in FIG. 2, in the upper panel 200, a common electrode 270 is formed on an insulation substrate 210. In one exemplary embodiment liquid crystal is deposited on one of the lower panel 100 and the upper panel 200, and the two display panels 100 and 200 are assembled. Alternative exemplary embodiments include configurations wherein the two display panels 100 and 200 are assembled and then liquid crystal material is injected therebetween.

Figure 10:
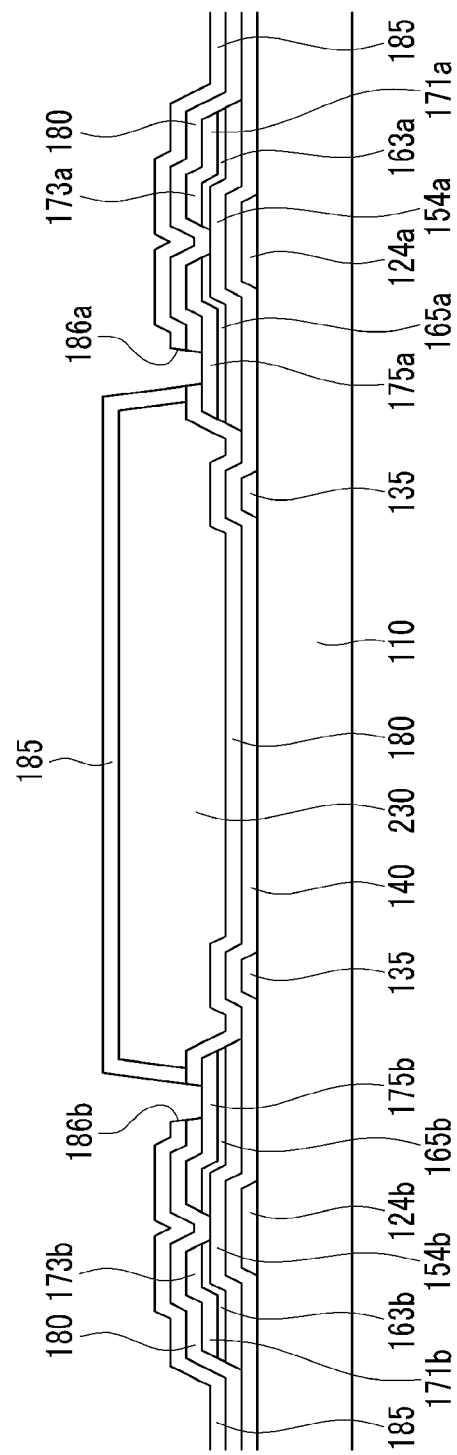

Alternative exemplary embodiments include configurations wherein the planarization layer 188 may be formed through other methods, and one alternative method will be described with reference to FIG. 10 and FIG. 11. FIG. 10 and FIG. 11 are cross-sectional views showing another exemplary embodiment of a manufacturing method of an exemplary embodiment of an LCD according to the present invention.

Firstly, as shown in FIG. 10, an overcoat 185 is formed on a passivation layer 180 and a color filter 230, and the overcoat 185 and the passivation layer 180 are patterned, e.g., through photolithography, to form contact holes 185a and 185b exposing the drain electrodes 175a and 175b.

Next, as shown in FIG. 11, a planarization organic layer 188a is coated on the overcoat 185 and exposed using a photomask 400 including a light blocking region and a transmittance region. In one exemplary embodiment, the photomask 400 may include a transparent substrate 410 and a light blocking layer 411, the light blocking layer 411 occupies the region corresponding to the color filter 230 and the region where the contact holes 185a and 185b will be formed for the light to be blocked, and is removed in the remaining region. The present exemplary embodiment exemplarily shows the embodiment wherein the planarization organic layer 188a is made of a material having negative photosensitivity. However, in an alternative exemplary embodiment wherein the planarization organic layer 188a is formed of a material having positive photosensitivity, the arrangement of the light blocking layer 411 is reversed.

Next, as shown in FIG. 7, the exposed planarization organic layer 188a is developed to form the planarization layer 188.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
a substrate;
a gate line including a gate electrode disposed on the substrate;
a gate insulating layer disposed on the gate line;
a data layer including a data line, a source electrode and a drain electrode facing the source electrode, wherein the data layer is disposed on the gate insulating layer;
a passivation layer disposed on the gate insulating layer and the data layer;
a color filter disposed on the passivation layer in a pixel area;
an overcoat layer disposed on the passivation layer and the color filter;
a planarization layer disposed on a portion of the overcoat layer corresponding to the gate line and the data layer; and
a pixel electrode disposed on the overcoat layer and in contact with the overcoat layer.

2. The liquid crystal display of claim 1, wherein the pixel electrode is disposed on at least a portion of the color filter.

3. The liquid crystal display of claim 2, wherein the planarization layer comprises an organic material.

4. The liquid crystal display of claim 3, wherein the passivation layer, the overcoat layer and the planarization layer include a contact hole which connects the pixel electrode and the drain electrode.

5. The liquid crystal display of claim 4, wherein the pixel electrode includes a first sub-pixel electrode and a second sub-pixel electrode which are separated from each other.

6. The liquid crystal display of claim 5, wherein the first sub-pixel electrode and the second sub-pixel electrode respectively include a plurality of branches.

7. The liquid crystal display of claim 6, wherein the second sub-pixel electrode includes a connection which encloses the branches of the first sub-pixel electrode.

8. The liquid crystal display of claim 1, further comprising:
a light blocking member disposed on the planarization layer.

9. The liquid crystal display of claim 8, wherein a spacer is disposed on the planarization layer.

10. A liquid crystal display comprising:
a substrate;
a gate line including a gate electrode disposed on the substrate;
a gate insulating layer disposed on the gate line;
a data layer including a data line, a source electrode and a drain electrode facing the source electrode, wherein the data layer is disposed on the gate insulating layer;
a color filter disposed on the gate insulating layer and the data layer;
a planarization layer disposed on a portion of the gate line, the data line and the drain electrode; and
a pixel electrode disposed on the color filter,
wherein the planarization layer is omitted between the color filter and the pixel electrode.

* * * * *